Oct. 15, 1963 G. KNAPP 3,107,285
TEMPERATURE CONTROL SYSTEM
Filed June 15, 1960
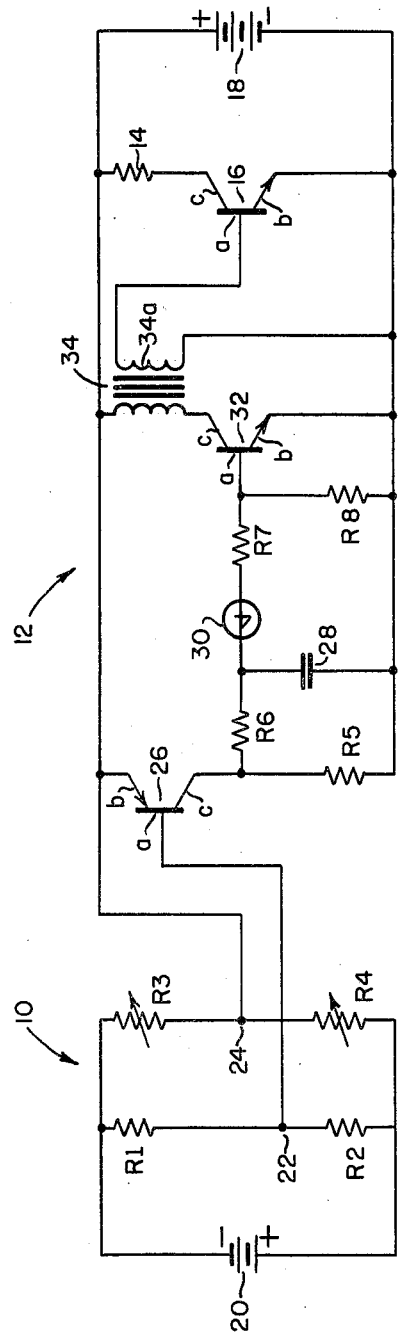
INVENTOR.
GUENTHER KNAPP
BY Kenway, Jenney,
Witter & Hildreth
ATTORNEYS

United States Patent Office

3,107,285
Patented Oct. 15, 1963

3,107,285
TEMPERATURE CONTROL SYSTEM
Guenther Knapp, Medford, Mass., assignor to National Company, Inc., Malden, Mass., a corporation of Massachusetts
Filed June 15, 1960, Ser. No. 36,400
3 Claims. (Cl. 219—20)

This invention relates to a novel temperature control system. More particularly, it relates to a system for controlling the current in a heating element to maintain a predetermined temperature in a crystal oven. The system incorporates a relaxation oscillator whose frequency depends on the error in the temperature of the heated object. A control switch in series with the heating element operates in synchronism with the oscillator, and thus the effective value of the current through the element varies as the temperature of the object varies.

Devices for maintaining the temperature of small objects or spaces at predetermined levels above the ambient generally use electric heating elements whose currents are controlled in response to the measured temperature. When the temperature drops below the desired level, the current is turned on to heat the object and thus raise its temperature. The current may be controlled by either of two general types of devices. One is a thermostatic type control which turns the current on when the temperature drops to a given point and turns it off again when it rises above a given level. The limiting factor in controlling temperature deviation by this method is the thermal inertia of the object being heated. When current to the heating element is cut off, the temperature within the object continues to rise, and, conversely, the temperature continues to fall for a finite period after the current is turned on. The temperature excursion may thus be considerably greater than the difference between the temperatures at which the current is switched on and off.

The problem of thermal inertia is largely overcome by the use of a servo type of control, which varies the current to the heating element according to the amount by which the temperature of the heated object differs from the desired temperature. As soon as the temperature departs from this value, current is supplied to the heating element, and, if the deviation continues to increase, the current is also increased, thus limiting the downward temperature excursion of the heated object. Conversely, as the temperature rises and approaches the desired level, the current is gradually reduced, thereby eliminating overshoot. Thus, temperature excusions may be kept at a minimum level, with a small residual error resulting from the requirement that a certain amount of heat must always be supplied to maintain the differential between the desired temperature and the ambient.

In many applications, a serious drawback of the continuously variable current regulators has been their relatively low efficiency. The current to the heating element has generally been controlled by regulating the conductance of a vacuum tube or transistor connected in series with the element. The tubes and transistors have been operated in a more or less linear mode, resulting in internal dissipation of at least as much energy as is consumed by the heating element. Thus, they must be capable of a relatively high dissipation, and the power supply must be capable of supplying considerably more power than is required by the heating element itself. As a result, a sizable portion of the cost of the control has been due to the useless extra power supply capacity and dissipation of the power generated thereby. Furthermore, the extra weight requirement is a substantial handicap in airborne or missile applications.

Accordingly, it is a principal object of my invention to provide an improved temperature control system adapted to maintain an object or space at a predetermined temperature.

A more specific object of my invention is the provision of a temperature control system adapted to maintain a constant temperature environment for a piezoelectric crystal of the type used to control the frequency of an electronic oscillator.

Another object of my invention is to provide a temperature control system of the above character which maintains the temperature at a desired level with a minimum amount of deviation.

A further object of my invention is to provide a system of the above character which controls the current in an electric heating element, with relatively little dissipation within the control circuit itself, thereby minimizing the electrc power input to the system.

Yet another object of my invention is to provide a temperature control system of the above character which has a simple construction and a high degree of reliability, together with light weight, thereby making its use advantageous in mobile, and particularly airborne and missile applications.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing, which is a schematic diagram of a temperature control system incorporating the features of my invention.

In general, my temperature control system uses a high speed switch, e.g., a switching transistor, to turn on and off the current to the heating element. The switch operates in synchronism with a relaxation oscillator and is pulsed to pass current to the heating element during the discharge portion of each cycle of operation of the oscillator. The frequency of oscillation is controlled by the output signal of a temperature sensing device in such manner that it increases with the deviation of the controlled temperature from the desired value thereof. Thus, the number of pulses of current passed to the heating element per unit time increases as the temperature to be controlled decreases. Since the length of the discharge time of the oscillator is substantially independent of its frequency, the number of pulses has a direct relationship to the effective value of the current.

Accordingly, the power delivered to the heating element is continuously variable, as in the prior continuous control devices mentioned above. However, the control is effected by means of a switch, and, as is well known in the art, a switch is a much more efficient device than a variable resistance control such as a vacuum tube or transistor operating in class A or B mode. It consumes negligible power, and, therefore, practically all of the power is delivered to the heating element. Furthermore, since its required internal dissipation is less, a less expensive transistor may be used, and without extensive provisions for the conduction of heat therefrom.

As seen in the drawing, my temperature control system includes a temperature sensing bridge generally indicated at 10, a relaxation oscillator generally indicated at 12, a heating element 14, a switch 16 in series with the heating element and a power supply illustratively shown as a battery 18. The bridge 10 consists of resistors R1, R2, R3 and R4 connected as shown to a battery 20. The resistors R1 and R2 are fixed, and the resistor R3 is preferably variable to provide adjustment of the temperature to be maintained within the crystal oven. The resistor R4 is a thermistor or other temperature sensitive resistor disposed within an object, such as a crystal oven (not shown), whose temperature is to be controlled. Thus, its resistance is a function of the actual temperature within the oven. Resistors R1, R2 and R3 are situated outside the oven and preferably have low temperature coefficients.

The resistor R3 is set to provide a bridge balance when the resistor R4 is at a given temperature. If the temperature of the resistor R4 decreases, its resistance changes, and the bridge is no longer balanced. An error voltage thus appears between the terminals 22 and 24. Assuming that the resistor R4 is a thermistor having a negative temperature coefficient of resistance and that the battery 20 has the polarity indicated in the drawing, the downward change in temperature will make the terminal 24 positive with respect to the terminal 22. The magnitude of the voltage appearing at these terminals is a function of the deviation of the temperature of the resistor R4 from the temperature at which the bridge balances.

The error signal developed across the terminals 22 and 24 is amplified by a transistor 26. As the error voltage increases, the current through the base 26a and emitter 26b connected to the bridge terminals also increases. The effective resistance between the emitter 26b and the collector 26c of the transistor thus decreases by transistor action, thereby increasing the voltage developed across a load resistor R5 in series with the collector. Thus, the voltage $V_{R5}$ increases as the controlled temperature decreases.

The oscillator 12 is a conventional relaxation oscillator. It includes a capacitor 28 charged through a series resistor R6. The capacitor 28 is discharged through a four layer diode 30 in series with a current limiting resistor R7 and the base-emitter circuit of a transistor 32. The diode 30, which may be a type 4D20M-3, such as is presently manufactured by the Shockley Transistor Corporation of Palo Alto, California, has the characteristics of a gaseous type voltage regulator. That is, there is negligible current through it until the voltage across it, which is essentially equal to the voltage across the capacitor 28, rises to a critical value, the striking voltage. Once this voltage is reached, the diode has a low internal resistance which is maintained until the voltage drops to a lower level, the cutoff voltage.

Thus, the capacitor 28 is charged through the resistor R6 until its voltage equals the striking voltage of the diode 30. It then discharges through the low resistance path offered by the diode 30, the resistor R7 and the transistor 32 until the diode cuts off. Next, it begins to charge once more through the resistor R6 to repeat the cycle. The time required for the capacitor to reach the striking voltage during each cycle depends on the charging voltage supplied across the resistor R5. The greater this voltage, the shorter will be the charging time, and, thus, the frequency of oscillation is a function of the temperature deviation measured by the resistor R4. The discharge time does not vary, since discharge of the capacitor 28 always takes place between two fixed levels, i.e., the striking and cutoff voltages of the diode 30. Accordingly, the base-emitter current of the transistor 32 is in the form of pulses whose length is constant and whose repetition rate is equal to the frequency of the oscillator 12.

Preferably, the oscillator 12 also includes a resistor R8 whose resistance is considerably greater than the base-emitter resistance of the transistor 32, so as not to affect the base-emitter current. The value of the resistor is small enough, however, to be much less than the base-collector resistance of the transistor when the latter is not conducting, i.e., when the diode 30 is cut off. Thus, in spite of leakage through the diode, the junction of the resistors R7 and R8 is essentially at ground potential during the charging of the capacitor 28, so as to insure cutoff of the transistor 32.

The transistor 32 serves as an amplifier for the current pulses developed in its base-emitter circuit. It is preferably a switching transistor which saturates during these pulses to provide a negligible effective resistance between its collector 32c and emitter 32b. The output of this transistor is developed across the terminals of the secondary winding 34a of a transformer 34 and applied between the base 16a and emitter 16b of another transistor serving as a switch 16. During each input pulse to the base-emitter circuit of the switch, there is a low resistance path between the collector 16c and emitter 16b, so that substantially the entire voltage of the battery 18 is developed across the heating element 14.

Accordingly, the current in the heating element 14 is in the form of pulses coincident with the input pulses to the switch 16. The repetition rate of these current pulses increases as the temperature measured by the bridge 10 decreases. Thus, as the temperature departs from its desired level, the average value of the heating current increases; the average current decreases as the measured temperature approaches this level.

By way of example, the transistors 26 and 32 may be types 2N1244 and 2N657, respectively. A type 2N1208 transistor will serve as the switch 16 in a crystal oven temperature regulator, with a potential of 60 volts supplied by the battery 18 and a resistance of 300 ohms for the heating element 14. Other circuit values which provide satisfactory operation are:

| | | |
|---|---|---|
| R1 | ohms | 2000 |
| R2 | do | 2000 |
| R3 | do | 2500 |
| R4 | do | [1] 2000 |
| R5 | do | 1500 |
| R6 | do | 27,000 |
| R7 | do | 2000 |
| R8 | do | 10,000 |
| Capacitor 28 | μf | .05 |
| Battery 20 | volts | 40 |

[1] At 80° C.

The element 14 may be a thermoelectric cooling device if it is desired to maintain the controlled temperature below the ambient. Furthermore, the circuit described above may be modified to both heat and cool, as required, to maintain a temperature within the range of ambient temperature variation. This may be done by switching current from the battery 18 between a heating element and a cooling device, depending on whether heating or cooling is required in order to maintain the controlled temperature at a constant value. Or a single thermoelectric element may be used, with the direction of the current through it being controlled in order to effect cooling or heating.

Thus, I have described an improved temperature control system which varies the effective value of current to a heating element by pulsing the current and varying the duty cycle of the pulses according to the deviation of the controlled temperature from its correct value. In the particular system described above, the pulse width is constant and the repetition rate is varied in order to change the duty cycle. The pulses are generated by a relaxation oscillator whose input voltage is derived from the error signal developed by a temperature-measuring bridge.

Thus, the circuit has the close control capability provided by continuous variation of the effective current in the heating element. At the same time, the current is valved by a switch, thereby providing high efficiency. It will be apparent that my invention will provide these advantages in the control of other conditions than temperature.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A temperature control system comprising temperature sensing means, said temperature sensing means providing an output varying with the deviation of the temperature from a desired value, a relaxation oscillator, means directly responsive to said temperature sensing means output for continuously increasing the frequency of oscillations of said relaxation oscillator with the deviation of the temperature from the controlled value, a device to modify the temperature of said system, control means to energize said device, and means to apply the output from said relaxation oscillator as the input to said control means, whereby the temperature-modifying device is activated in accordance with the output from said temperature sensing means.

2. A temperature control system comprising temperature sensing means, said temperature sensing means providing an output varying with the deviation of the temperature from a desired value, a relaxation oscillator, means responsive to said temperature sensing means output for controlling the frequency of said relaxation oscillator, pulse shaping means having an input and an output, said pulse shaping means being adapted to provide pulses of uniform width, means to apply the output from said relaxation oscillator as the input to said pulse shaping means, a temperature modifying device, a source of energy, control means to control the flow of energy from said source to said temperature modifying device, and means to apply the output of said pulse shaping means as the input to said control means, whereby the energy supplied by said source varies in accordance with the output from said temperature sensing means.

3. Temperature controlling apparatus comprising temperature sensing means, said temperature sensing means providing a voltage output, a transistor having a base, a collector and an emitter, means to apply said sensing voltage output between the base and emitter of said first transistor, a first resistive network, a capacitive storage device connected to said first resistive network, means to connect the collector of said first transistor to said first resistive network, whereby an output from said first transistor charges said capacitive storage device to an increased voltage, a semi-conductor device having break-down voltage characteristics, said semi-conductor device permitting the flow of current when a predetermined voltage is reached, a second resistive network, means connecting said semi-conductor device between said capacitive storage device and said second resistive network, a second transistor having a base, a collector and an emitter, means connecting said second resistive network to the base of said second transistor, whereby a pulse will be applied between the base and emitter of said second transistor when the voltage across said capacitive storage device reaches a predetermined value, a third transistor having a base, a collector and an emitter, a source of energy, a temperature modifying device, said source of energy and said temperature modifying device being connected in series between the collector and emitter of said third transistor, and means to supply the output of said second transistor as an input between the base and emitter of said third transistor, whereby a pulse of energy is supplied each time said capacitive storage device has been charged to a predetermined voltage.

References Cited in the file of this patent

UNITED STATES PATENTS

| | | |
|---|---|---|
| 2,017,859 | Halstead | Oct. 22, 1935 |
| 2,447,816 | Rieber | Aug. 24, 1948 |
| 2,528,626 | Wannamaker et al. | Nov. 7, 1950 |
| 2,597,023 | Olving | May 20, 1952 |
| 2,932,714 | Merrill | Apr. 12, 1960 |
| 2,967,924 | Friend | Jan. 10, 1961 |
| 2,984,729 | Hykes et al. | May 16, 1961 |